(12) United States Patent
Holloway et al.

(10) Patent No.: US 8,490,168 B1
(45) Date of Patent: Jul. 16, 2013

(54) METHOD FOR AUTHENTICATING A USER WITHIN A MULTIPLE WEBSITE ENVIRONMENT TO PROVIDE SECURE ACCESS

(75) Inventors: James Holloway, Orlando, FL (US); Jerry Birkes, Altamonte Springs, FL (US); Alton Drake, Orlando, FL (US)

(73) Assignee: AT&T Intellectual Property I, L.P., Reno, NV (US)

( * ) Notice: Subject to any disclaimer, the term of this patent is extended or adjusted under 35 U.S.C. 154(b) by 1236 days.

(21) Appl. No.: 11/248,050

(22) Filed: Oct. 12, 2005

(51) Int. Cl.
*H04L 29/06* (2006.01)

(52) U.S. Cl.
USPC ........... 726/8; 726/7; 726/9; 726/10; 709/229

(58) Field of Classification Search
None
See application file for complete search history.

(56) References Cited

U.S. PATENT DOCUMENTS

| | | | |
|---|---|---|---|
| 5,996,076 A | 11/1999 | Rowney et al. | |
| 6,338,138 B1 * | 1/2002 | Raduchel et al. | 713/155 |
| 6,385,701 B1 * | 5/2002 | Krein et al. | 711/141 |
| 6,678,731 B1 * | 1/2004 | Howard et al. | 709/225 |
| 6,754,825 B1 | 6/2004 | Lennie | |
| 6,847,953 B2 | 1/2005 | Kuo | |
| 6,879,965 B2 | 4/2005 | Fung et al. | |
| 6,898,711 B1 | 5/2005 | Bauman | |
| 6,931,382 B2 | 8/2005 | Laage et al. | |
| 6,934,858 B2 | 8/2005 | Woodhill | |
| 7,016,875 B1 * | 3/2006 | Steele et al. | 705/44 |
| 7,089,310 B1 * | 8/2006 | Ellerman et al. | 709/227 |
| 7,191,467 B1 * | 3/2007 | Dujari et al. | 726/5 |
| 7,231,661 B1 * | 6/2007 | Villavicencio et al. | 726/4 |
| 7,251,827 B1 * | 7/2007 | Guo et al. | 726/8 |
| 7,257,581 B1 * | 8/2007 | Steele et al. | 707/10 |
| 7,305,470 B2 * | 12/2007 | Tom et al. | 709/225 |
| 7,334,013 B1 * | 2/2008 | Calinov et al. | 709/201 |
| 7,401,235 B2 * | 7/2008 | Mowers et al. | 726/2 |
| 7,421,731 B2 * | 9/2008 | Mitchell et al. | 726/3 |
| 7,500,262 B1 * | 3/2009 | Sanin et al. | 726/2 |
| 7,716,469 B2 * | 5/2010 | Bhatnagar et al. | 713/156 |
| 8,069,120 B2 * | 11/2011 | Buehler et al. | 705/64 |
| 8,195,574 B2 * | 6/2012 | Buehler et al. | 705/64 |
| 2002/0073045 A1 * | 6/2002 | Rubin et al. | 705/65 |
| 2002/0099952 A1 * | 7/2002 | Lambert et al. | 713/200 |
| 2003/0172090 A1 * | 9/2003 | Asunmaa et al. | 707/200 |
| 2003/0177388 A1 * | 9/2003 | Botz et al. | 713/201 |
| 2003/0188193 A1 * | 10/2003 | Venkataramappa | 713/201 |
| 2004/0230831 A1 * | 11/2004 | Spelman et al. | 713/201 |

(Continued)

OTHER PUBLICATIONS

Microsoft.Net Passport Technical Overview, 2001, entire article.*

*Primary Examiner* — Nathan Flynn
*Assistant Examiner* — Michael R Vaughan
(74) *Attorney, Agent, or Firm* — Myers Bigel Sibley & Sajovec, P.A.

(57) ABSTRACT

A method and an apparatus with computer readable media for creation of a common token, with at least one associated usage limitation, for authenticating a user within a multiple website environment are disclosed. The methodology employs a secured user authentication mechanism, for example, as a common token representative of the user, to be used in the authentication of a user and for performing secure online network transactions by the authenticated user in a multiple website environment. The common token can be used at a first website to perform a business, financial, or personal transaction for example; and then, the common token can be used again at a second website, a third website, etc. to perform one or more tasks on behalf of the authenticated user and within the token's usage or associated limitations.

9 Claims, 2 Drawing Sheets

U.S. PATENT DOCUMENTS

| | | |
|---|---|---|
| 2005/0005133 A1* | 1/2005 | Xia et al. ............... 713/185 |
| 2005/0149759 A1 | 7/2005 | Vishwanath et al. |
| 2005/0154887 A1* | 7/2005 | Birk et al. ............... 713/168 |
| 2005/0182684 A1 | 8/2005 | Dawson |
| 2005/0193093 A1* | 9/2005 | Mathew et al. ............... 709/219 |
| 2006/0085345 A1* | 4/2006 | Khandelwal et al. ............ 705/51 |
| 2006/0277218 A1* | 12/2006 | Franco et al. ............... 707/200 |
| 2007/0266257 A1 | 11/2007 | Camaisa et al. |
| 2008/0244039 A1 | 10/2008 | Wertz |
| 2009/0138953 A1* | 5/2009 | Lyon ............... 726/9 |
| 2009/0183003 A1* | 7/2009 | Haverinen ............... 713/168 |
| 2010/0107225 A1 | 4/2010 | Spencer et al. |
| 2010/0299734 A1* | 11/2010 | Lynch et al. ............... 726/6 |

\* cited by examiner

METHOD FOR AUTHENTICATING A USER WITHIN A MULTIPLE WEBSITE ENVIRONMENT TO PROVIDE SECURE ACCESS

FIELD

The embodiments relate generally to systems, methods, and computer readable media for providing secure online transactions using a common token to authenticate a user for multiple websites on a network system.

BACKGROUND

Public and private usage of distributed processing systems, such as the Internet, and other information wide area networks, continues to increase at a prodigious rate. Conducting commerce over such distributed systems (i.e., e-business) continues to gain in popularity. Users of e-business and other identity-sensitive, electronic applications are required to provide a user identifier and a password (e.g., PIN number) before the user is permitted access to such applications. When these and other applications operate within a multiple website environment, each website must get involved in a given transaction to authenticate the user prior to allowing access to these websites. A process authenticates a user generally by verifying that the user password is properly associated with the user identifier.

A conventional approach to authenticating a user, for purposes of performing a number of tasks on behalf of the user and by using a number of processes, involves caching the user identifier and password. Caching the user's identifier and password obviates the need to request this information repeatedly from the user by each of the processes involved in a particular transaction. From a security perspective, such an approach can be problematic and costly. Although encrypting the user identifier and password can provide some degree of increased security, increasing the encryption strength generally limits the ability to export the program encompassing the encryption algorithm(s) overseas. Therefore, caching can be very difficult when multiple websites are involved.

Thus, a need exists for an improved systematic approach to authenticating a user in multiple website environments. A need exists for such an approach that provides for a high degree of security, particularly with regard to user identity and authentication.

The certain embodiments of the invention meet these needs.

SUMMARY

The present method and apparatus are for authenticating a user using a common token for secured online access to a multiple website environment. A user is initially authenticated, such as by verifying the user's identification and password. Additionally, the user receives a common token representative of the user and in response to successfully authenticating the user. The common token is associated with one or more limitations that place restrictions on how the common token can be used. For example, the common token can be limited to a list of company names, to particular lists of permitted tasks, or to a list of permitted email addresses.

The common token can be transferred from a first website to a second website. Each website can be on a single server or on different servers.

The common token can be invalidated upon violation of an association limitation. The limitations of the common token can include a pre-established time-out period, which can necessitate the obtaining of another common token, if at all, during the pre-established time-out period. Upon expiration of the predetermined time-out period, the common token can be invalidated.

The embodied system for authenticating a user within a website process environment includes a processor on which a first website and a second website, respectively, can communicate. A first interface can be called by the first website to authenticate the user. If the user is authenticated, a secure server generates a common token representative of the user. Then, tasks can be performed at that first website. Next, the common token can be used with a second, third, or more websites based on limitations associated with the common token.

An additional interface can be called by the second website to verify the validity of the common token. The second interface can invalidate the common token in response to a violation of associated limitations. If the common token is determined to be valid, the second interface allows one or more tasks to be performed on the website on behalf of the user represented by the secured common token.

The secured access services system includes a processor coupled to a memory. The memory can be configured to include one or more lookup tables for storing information used by the processor for purposes of managing one or more of the generated secured common tokens. A common token can be defined as a string of data that includes information or portions of information required to authenticate the user. Other information required to authenticate the user can be stored in a lookup table. Processing of the information stored in a common token and a corresponding lookup table entry provide increased processing security.

BRIEF DESCRIPTION OF THE DRAWINGS

The detailed description will be better understood in conjunction with the accompanying drawings as follows.

Figure 1:
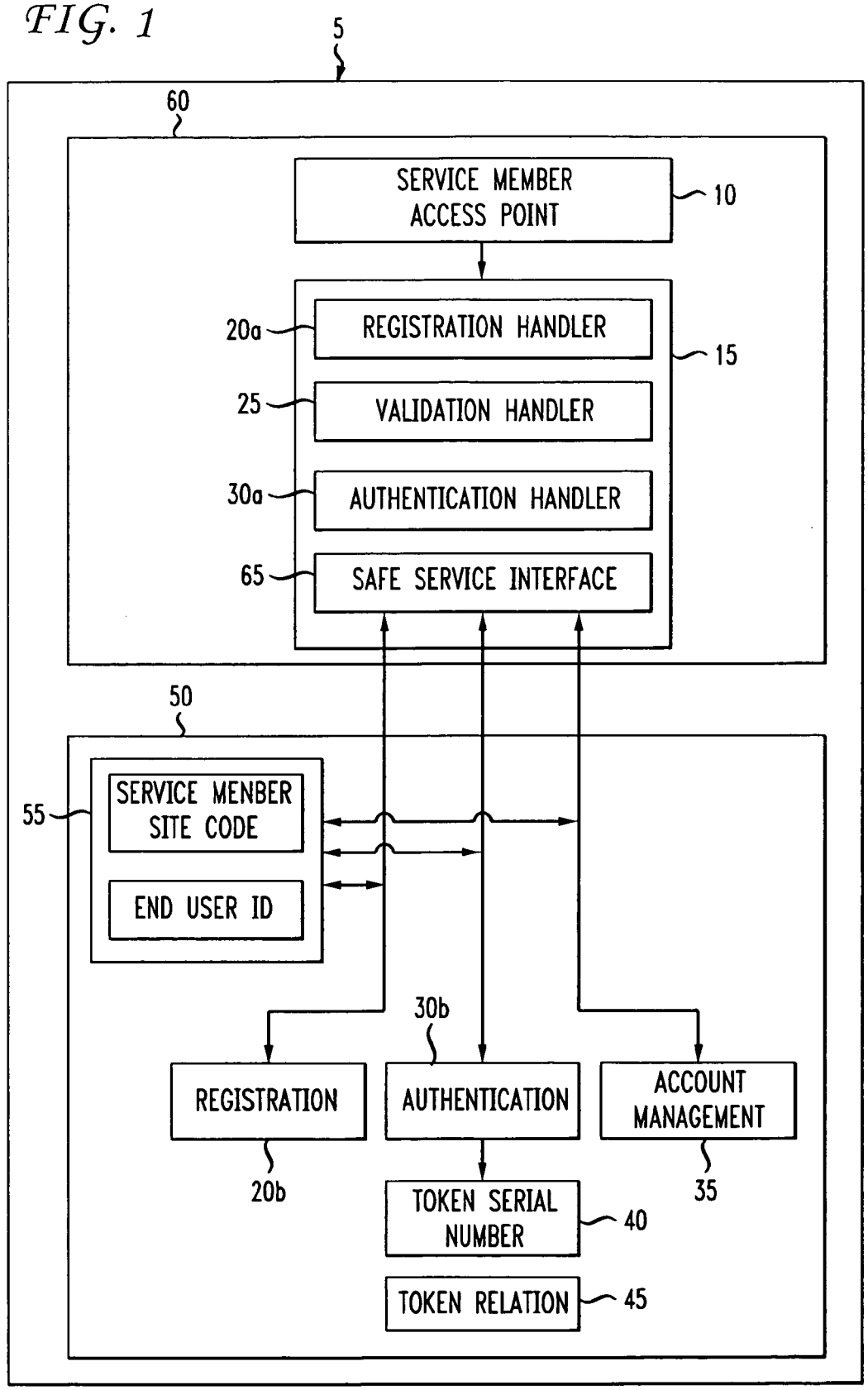
FIG. 1 is a depiction of a multiple website environment in which user authentication is effected using a common token in the present system.

The present embodiments are detailed below with reference to the listed Figures.

DETAILED DESCRIPTION OF THE EMBODIMENTS

Before explaining the presently disclosed embodiments of the invention in detail, it is to be understood that the embodiments are not limited to the particular embodiments, and that the invention can be practiced or carried out in various ways.

The present method and apparatus provide for a secured, user authentication mechanism, referred to herein as a common token. The secured user authentication mechanism or the common token is generated by a secure server as a result of a request from a customer's website or other website. The common token, unique to a user with a token serial number (e.g., one-time pass code and pin) can be used to authenticate a particular user on a secured server system for accessing the user's account information, or other sensitive information on one or multiple websites. The common token can be passed to one or more additional websites, wherein the common token can be used to perform one or more tasks on behalf of the authenticated user.

A common token can be viewed as a limited-use, non-forgeable representation of a user that provides an authentication mechanism. For example, one or more websites receiving a valid common token can recognize that the supplier, or "authentication provider," supplying the common token is trusted, and the user is authorized to perform tasks on those websites.

The method to create the common token can involve authenticating the user in a separate process. Alternatively, the user can receive a common token from another supplying process.

As a benefit, consumers can access their online accounts, with various institutions or companies and at multiple websites, in a secure manner by using a single common token device. The present system alleviates any need for multiple tokens, such as one token for each financial institution's transactions or website.

The secured user authentication approach, according to the present embodiments, relates to the ability of a common token to represent a user in a multiple website environment. The holder of a common token effectively becomes that user. For example, a common token holder can be allowed to perform work on behalf of the user represented by that common token. Since a common token represents a user, common tokens can be used anytime a user needs to be authenticated. Since common tokens have usage restrictions and possess a number of control mechanisms, a compromised common token can be viewed as a significantly lower security risk as compared to a compromised conventional user ID/password combination.

A user authentication approach employing common tokens in accordance with the principles of the present embodiments provides for enhanced user authentication and processing security for a wide range of multiple process applications. The embodiments allow for many different methods of authenticating a user to be accommodated. For example, the embodiments can be used with digital certificate IDs, retinal scan data, or palm print data. Use of common tokens is particularly well-suited in client/server applications.

The embodiments relate to computer readable medium and apparatus for creating a common token that is representative of the user in response to authenticating the user successfully, and authenticating a common token for users to have inexpensive, secure access to multiple networks and websites regarding sensitive, user information. The embodiments use a common token to access multiple internet websites.

The common token is associated with one or more limitations that place restrictions on how the common token can be used. For example, the common token can be limited to a list of company names, to particular lists of permitted tasks, or to a list of permitted email addresses. The common token can be invalidated upon violation of the associated limitations. For example, the limitations of the common token can include a pre-established time-out period or expiration date. This requires the user to obtain another common token during the pre-established time-out period or, upon expiration of the predetermined time-out period, the common token can be invalidated. The associated limitations, as well as the user of the common token, can be modified, added, or deleted during the time period in which the common token can be used.

The embodiments contemplate creating an authenticator of a common token that provides access to multiple websites.

A client is generally understood in the art as software that provides a user interface capability for a function or application. A client runs in a process separate from a server, and validates the end user. Validating a user involves determining who the user is and verifying the true identity of that user, generally through the use of a user identifier/password, digital certificate handshake, or some other trusted means. A client can be software running on a local platform or on another platform.

A server is generally understood in the art as software running in a process or processes on a particular platform. This software can be used to either perform one or more tasks on behalf of a first user, or to contact other servers to perform one or more tasks on behalf of the first user. Each process performs tasks on behalf of a particular user. The user can be different for each process. Additionally, the software running in these processes can have the capabilities of changing the user on whose behalf the software is performing the tasks. A server can have no direct means of communicating with the end user.

One particular system arrangement involves three levels: a first level authenticating the user and the user interface, a second level with a server which controls the application, and one or more third level servers that perform individual tasks. All of these processes can run on the same platform or on different platforms.

Although reference will be made to a client/server environment when discussing several of the features and advantages of a secured user authentication approach according to the principles of the present embodiments, this environment of utilization is provided for illustrative purposes, only, and not as a limitation. A secured user authentication methodology according to the present embodiment can be implemented in any multiple website environment in which user authentication is required or desired.

With reference to the figures, FIG. 1 depicts a multiple website environment in which user authentication is effected using a common token in the present embodiments (5). A user accesses the secured user authentication system's subscription process via an enabled Service Member Access Point (10), which can be a service provider, a business institution, or a similar entity that is enabled for use of common tokens for secured user authentication. The user selects to subscribe to an interfaced secured, user-authentication, integrated services system (15), (i.e., AT&T™ Secured Access For Everyone (SAFE)) and provides identity information for registration (20*a*), and validation (25), and authentication (30*a*) of the user. The initial processes involving the subscription are performed on the client side (60). Then, the subscription is processed for authorization using a server system (50), wherein the authorizer examines the request and information and either rejects or confirms the authorization. If the user registration (20*b*) is confirmed, the user receives a confirmation with URL referencing a provisioning flow and including account management services (35). The user selects the authentication technology as a common token (40) and the user is authenticated (30*b*) using the user's sensitive identity profile information, such as a user ID and password along with a service member site code (55). Next, the common token is generated representative of the user in response to a successful authentication and a common token serial number is assigned (40). The common token can be generated for one user ID or for many user ID's as a token relation (45). The requester or user of a common token can specify the usage limitations associated with the common token, such as a list of companies that the token can be used with, a list of email addresses, or some other limitations. The common token can be transferred from a first website to a second website via a secure server and an embedded website code for use on the additional websites. Each subsequent website authenticates the common token serial number or ID and password and validates the user for a secure transaction. Each website can be on a single server or on different servers.

The issued common token permits the user or holder to perform work on a first website, a second website, and so on (10), through a secured access services interface (i.e., AT&T's Secured Access For Everyone (SAFE) Services Interface) (65). The common token provides a mechanism to delegate the authority to perform work on behalf of the user at different service websites (10).

A validator or validation handler (25a) can be installed as a part of the secure access services and on the website permitting token users to be ensured that all common tokens are valid. If usage restrictions have been violated, the validator can invalidate the common token. If the common token is found to be valid, the validator allows tasks to be performed on the second website on behalf of the user represented by the common token.

The embodiments permit multiple users to request a single common token by making appropriate requests to the secure server and furnishing the common token pin or serial number and other necessary identification.

The common token can be a regenerable common token, which represents a common token that can be "reloaded" like credits on a telephone calling card to keep the common token from expiration. The common token can be generated by an issuer to an owner and the owner assigns the common token to the user to maintain secrecy about the user's identity.

Regenerable common tokens can be used by clients when the client requires the common token to be long-lived, so that it does not have to request the user for the user ID/password again or cache the user ID/password. If the client is operating on the same machine as the primary server platform or, alternatively, if the client can afford the extra overhead of multiple calls to the primary server platform, regenerable common tokens can be used.

Because a client can lose control, possibly, over a common token in certain situations, common token invalidation interfaces can be invoked in order to invalidate specified common tokens, all common tokens for a given user, or all tokens for all users. If an administrator or user suspects that a common token or tokens are being used in an unintended manner, these interfaces can be used to invalidate those common tokens.

Various types of common tokens, having varying functionality, can be employed within a multiple website environment to achieve a desired level of security and processing efficiency within the constraints of a particular application. Accordingly, the common tokens and related applications described herein represent only a few of many possible user authentication mechanisms that fall within the scope of the present embodiments.

Given some user security concerns, the common tokens can be created to time-out (i.e., become invalid) after a relatively short period of time. The length of the time-out period can be related to the length of the common token. The time-out period can be significantly shorter than the time required to attempt to swap to all possible combinations of bits in a common token. A common token can be generated such that the common token contains no readily available information that might be of use to someone who surreptitiously obtained the common token and is attempting to ascertain the user identifier represented by that common token. Without this information, a valid common token is considerably more difficult to attack.

Properly protecting a common token can be assumed to be the responsibility of the code that generates and/or receives the common token. Measures of properly protecting a common token can include avoiding storing of a common token in a location which is easily accessible to other processes, not transmitting a common token over a network without proper encoding/encryption protection, and taking care to ensure that a common token is only passed to processes or servers that are known and trusted. As mentioned previously, a common token is analogous to a user identifier and its associated password, and must be treated accordingly.

The embodiments permit an administrator to have the ability to invalidate all common tokens for a specified user. Any user can have the ability to invalidate all common tokens representing himself/herself. Both interactive and programmatic interfaces can be provided to invalidate one or more common tokens for a single user. This interface can be used by the client and/or server to invalidate common tokens in a number of situations, such as when detecting a potential security problem or determining that a particular common token is no longer needed.

The present system for using a common token to authenticate a user within a multiple website environment includes an apparatus for authenticating the user within the website process environment. This system and apparatus include a processor on which a first website and a second website, respectively, can operate. A first interface, in communication with the first processor with data storage for validating a user and generating a common token, can be called by the first website to authenticate the user, where the user selects a login and password for the first website. If the user is authenticated, a secure server generates a common token with an embedded website code for the first website. The common token is representative of the user in response to authenticating the user successfully and contains any associated limitations specified by the user. The common token permits at least one task to be performed at that first website. Next, a third interface, in communication with a second website and operating without a common trust to the first website that authenticated the user with logins and passwords, can be adapted to use the common token of the first website to permit tasks to be performed at the second website, after authentication.

The second website can call a second interface to verify the validity of the common token by ID and password and secured user authentication. The second interface can invalidate the common token in response to a violation of associated limitations. If the common token is determined to be valid, the second interface allows one or more tasks to be performed on the website on behalf of the user represented by the secured common token.

The embodiments can permit the processor to be coupled to a memory, which can be configured to include one or more lookup tables for storing information used by the processor for purposes of managing one or more of the generated secured common tokens. A common token can be defined as a string of data that includes information or portions of information required to authenticate the user. Other information required to authenticate the user can be stored in a lookup table. Processing of the information stored in a common token and a corresponding lookup table entry provide increased processing security.

Figure 2:
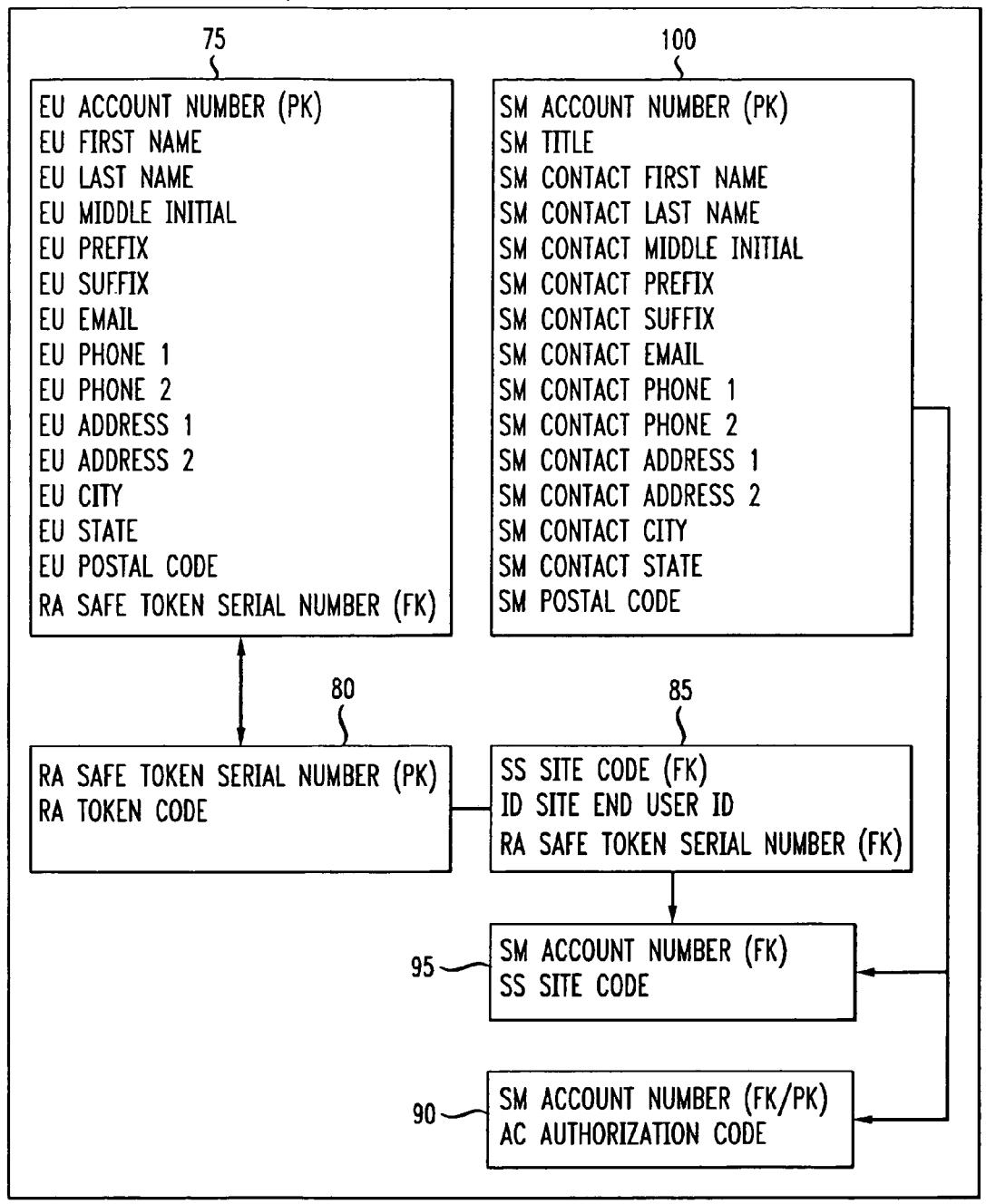
FIG. 2 is a block diagram of a common token lookup table used to manage common tokens in accordance with an embodiment of the present system.

FIG. 2 is a block diagram of a common token lookup table (70) used to manage common tokens in accordance with an embodiment of the present system. The present system permits lookup tables to be used to manage common tokens. These lookup tables can contain relevant information about the identity of a user included in a user account profile (75) and to swap to the user represented by the common token as a member of a secured access integrated services system (100). The user's ID information and member site code information (85) are used in generating a token serial number (80)

that becomes a part of a user's account profile information (75). This information is used to authenticate the user (90) for work on a particular website (95) as a member of a secured access services system (100). For security purposes, only the information about the common token (80) and/or the user represented by the common token (85), which is absolutely necessary to facilitate and manage this information, is generally stored in a lookup table entry. This can create great difficulties for someone, having access to the table, to be able to use any of the information contained therein, and it furthers the objective of making it very difficult or impossible to generate a valid common token outside of established interfaces, even if common token algorithms are known.

A common token lookup table can be implemented as static memory in order to provide for fast lookups. Multiple lookup tables for a common token can be necessary, but the total number of lookup tables that can be created can be limited to avoid an attack that attempts to use all available disk space. For example, it can be desirable to provide a sufficient number of common token lookup tables to support at least 1 million common tokens which can exist at any time. The number of lookup tables that are required for a given application can be dependent on the number of bytes used for each table entry.

As another example, on a machine with 10,000 user identifiers, each user identifier can have 200 common tokens generated for it before filling up a lookup table. In this case, the lookup table might reach an overflow condition if greater than 1,000,000 common tokens are generated before the removal period has been reached for the first common token.

In most cases, an overflow condition will only occur if a given program attempts to continually generate valid common tokens until all of the available table space is full. Potential overflow conditions can be addressed at the interface level, such as by providing an audit record and sending a message to an appropriate system message repository. An interface that can be used from a program or a command line is made available to destroy existing table entry spaces and to generate new ones in order to avoid, or in response to, an overflow condition.

If the common token lookup tables do become full, new common tokens cannot be generated until one or more common tokens are removed from a given table.

During the creation of a lookup table, pointers as a DES encryption key of suitable length, such as 56-bytes, can be generated and stored so that it can be accessed either directly or indirectly from the table of lookup pointers. The encryption key can be implemented as the address of the location that contains the key. For enhanced protection, a hardware cryptography device can be provided to store an encryption key and to perform the encryption/decryption procedures.

A common token can comprise a string of bytes that represents a specific user identifier and the associated password. A desirable situation can be to ensure that neither the common token nor the associated table lookup entry, individually, contain all of the information useful for defining a common token. The common token can be a 32-byte long data string, with an SHA-1 hash algorithm. SHA-1 hash algorithms are well known to those skilled in the art.

A 32-byte common token represents a total of 256 bits. This number of bits provides for approximately $1.16e+77$ possible bit patterns. A 32-byte common token that survives for 60 minutes or less can be considered to be very safe against all or most attacks.

A common token can include eight bytes of random data for purposes of complicating the process of surreptitiously manufacturing valid common tokens by someone who knows the layout of the common tokens and the algorithms used to manufacture valid common tokens. Four bytes can be an offset with respect to the address of the lookup table where the common token entry resides.

An SHA-1 hash result can be run against the data gathered from both the common token and some or all of the data contained in the lookup table, including the random data. Hashing over random data stored in both the common token and the lookup table entry increases the difficulty associated with an attempt to manufacture a valid common token outside of the appropriate interfaces.

When a request for a common token is received, and after authenticating the specified user or after verifying that the caller has authority or privileges to generate a common token for the requested user identifier, a number of processes occur. These processes include determining which lookup table to use and saving an offset into the table of lookup table pointers. A determination can be made as to which entry in the lookup table is to be used, and the offset can be saved. Data necessary to swap to the common token is gathered and stored in the lookup table entry. Time-out/removal period data can be stored in lookup table entry. Sixteen bytes of random data are generated. Eight bytes of the random data are stored in the lookup table entry.

The first part of the common token is constructed using the remaining bytes of random data and the offsets. SHA-1 hash data is generated using data in the lookup table entry and data in the first part of the common token. The random data can be split between the common token and the lookup table entry which are used in the hash algorithm, making it extremely difficult for someone to manufacture an existing common token, even if they know the algorithms used, offsets to the lookup table entry for that token, and all of the data stored in the lookup table entry.

A first portion of the SHA-1 hash result (e.g., 10 bytes) can be stored as the last part of the common token structure. A second portion of the hash result (e.g., 10 bytes) can be stored in a lookup table entry. A two-way bulk encryption algorithm, such as a DES encryption algorithm, can be used. A 56-bit encryption method can be sufficient if the longest lived common token survives no longer than approximately one hour. A single encryption key can be used for all of the lookup tables. This key can be generated at system boot-up time and stored in the table of pointers to lookup tables. The encrypted common token can then be returned to the requester.

A number of interfaces can be used for generating common tokens of varying types. These interfaces are used to define various characteristics and controls that can be made available in the common tokens. Additional interfaces can be provided for verifying and managing common tokens, and for managing the entries in the lookup tables.

A common token verification interface can be used to verify that the common token is valid, to invalidate the common token if the token is expired, and to return an address of the lookup table entry if the common token is valid. To determine if a common token is valid, the common token verification interface decrypts the common token using the key stored in the lookup table, and uses the offsets to find the potential lookup table entry.

The common token verification interface runs the appropriate hash algorithm over the appropriate data and compares the result to the hashed value, ten bytes of which are stored in the common token and ten more of which are stored in common token lookup table entry. If these values do not match, the interface returns an invalid common token error. For example, an invalid common token error cam occur when a forged common token or a common token has been expired for longer than the removal time period. If these values match, then the entry is considered valid. If the entry is marked invalid, a reason code indicating the reasons for invalidity is returned to the caller.

Another embodiment concerns a programmed product which includes a signal-bearing medium embodying a program of machine-readable instructions, executable by a digital processor to perform method steps for authenticating a user within a multiple website environment. The signal-bearing media can include, for example, random access memory (RAM) provided within, or otherwise coupled to, one or more of the platform processors.

Alternatively, the program of machine-readable instructions can be contained in other signal-bearing media, such as one or more magnetic data storage diskettes, direct access data storage disks (e.g., a conventional hard drive or a RAID array), magnetic tape, alterable or non-alterable electronic read-only memory (e.g., EEPROM, ROM), flash memory, and optical storage devices (e.g., CDROM or WORM). Other signal-bearing media includes transmission media such as digital, analog, and communication links and wireless. In an illustrative embodiment, the machine-readable instructions can constitute lines of compiled "C" language code or "C++" object-oriented code.

The foregoing description of the various embodiments of the present systems and methods have been presented for the purposes of illustration and description. It is not intended to be exhaustive or to limit the embodiments to the precise form disclosed. Many modifications and variations are possible in light of the above teaching.

While these embodiments have been described with emphasis on the embodiments, it can be understood that within the scope of the appended claims, the embodiments might be practiced other than as specifically described herein.

What is claimed is:

1. A computer program product that is configured to authenticate users within a multiple website environment, comprising a non-transitory computer readable storage medium having encoded thereon instructions that, when executed on a processor, cause the processor at least to perform the following:
    authenticate a user at a first website via a first interface;
    generate a common token representative of the user in response to successful authentication of the user for the first website, wherein the common token includes usage limitations specified directly by the user that place restrictions on how the common token can be used, wherein the user specified limitations include a list of permitted tasks the user is authorized to perform on the first website and on a plurality of websites different from the first website, wherein the user specified limitations include a list of company websites the user is authorized to access, and wherein the common token can be invalidated upon violation of any of the user specified limitations;
    insert the common token into a second website operating without a common trust to the first website;
    verify that the inserted common token is valid via a second interface; and
    allow a task to be performed on the second website on behalf of the user via a third interface in response to verifying that the common token is valid.

2. The computer program product of claim 1, wherein the user is authenticated via the first interface by an identification and password associated with the user.

3. The computer program product of claim 1, wherein the computer readable storage medium has encoded thereon instructions that, when executed on the processor, cause the processor to modify, add and delete the user specified limitations for the common token during a time period in which the common token can be used.

4. The computer program product of claim 1, wherein the computer readable storage medium has encoded thereon instructions that, when executed on the processor, cause the processor to modify, add and delete the user of the common token during a time period in which the common token can be used.

5. The computer program product of claim 1, wherein the common token user specified limitations comprise an expiration date after which the common token can no longer be used.

6. The computer program product of claim 1, wherein the common token is characterized as a regenerable common token that can be reloaded to keep the common token from expiring.

7. The computer program product of claim 1, wherein the common token is a 32-byte common token comprising 8 bytes of random data and 4 bytes that are offset with respect to an address of a lookup table where an entry for the common token resides.

8. A method of authenticating users within a multiple website environment, comprising:
    authenticating a user at a first website via a first interface;
    generating a common token representative of the user in response to successful authentication of the user for the first website, wherein the common token includes usage limitations specified directly by the user that place restrictions on how the common token can be used, wherein the user specified limitations include a list of permitted tasks the user is authorized to perform on the first website and on a plurality of websites different from the first website, wherein the user specified limitations include a list of company websites the user is authorized to access, and wherein the common token can be invalidated upon violation of any of the user specified limitations;
    inserting the common token into a second website operating without a common trust to the first website;
    verifying that the inserted common token is valid via a second interface; and
    allowing a task to be performed on the second website on behalf of the user via a third interface in response to verifying that the common token is valid.

9. The method of claim 8, wherein the common token is a 32-byte common token comprising 8 bytes of random data and 4 bytes that are offset with respect to an address of a lookup table where an entry for the common token resides.

* * * * *

UNITED STATES PATENT AND TRADEMARK OFFICE
CERTIFICATE OF CORRECTION

PATENT NO.        : 8,490,168 B1
APPLICATION NO.   : 11/248050
DATED             : July 16, 2013
INVENTOR(S)       : Holloway et al.

It is certified that error appears in the above-identified patent and that said Letters Patent is hereby corrected as shown below:

On Title Page:
Item 73, Assignee: Please correct "AT&T Intellectual Property I, L.P."
to read -- AT&T Intellectual Property II, L.P. --

Signed and Sealed this
Twentieth Day of August, 2013

Teresa Stanek Rea
*Acting Director of the United States Patent and Trademark Office*